United States Patent Office 3,829,304
Patented Aug. 13, 1974

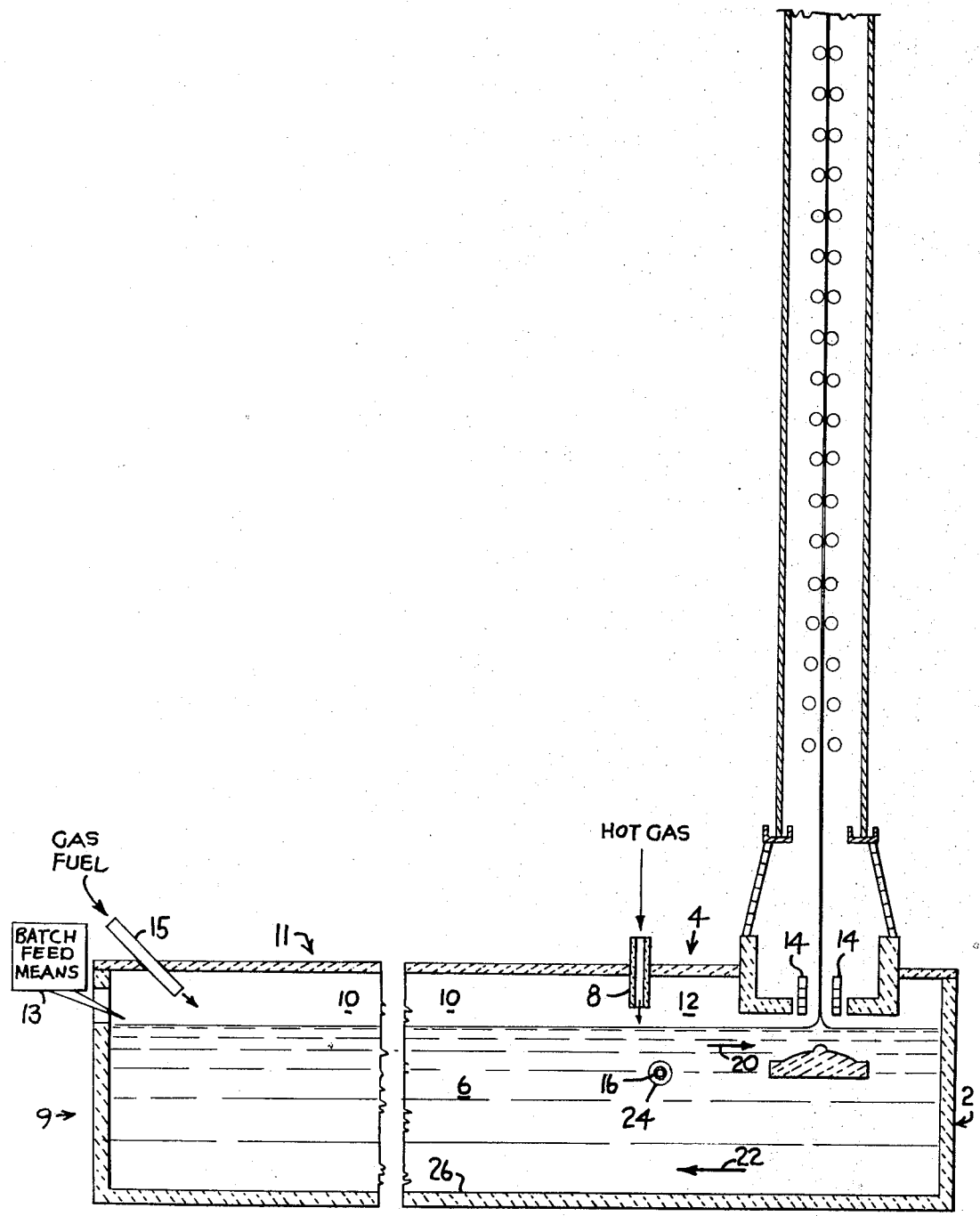

3,829,304
GLASS DRAWING CONDITIONING MEANS
Gerald E. Kunkle, New Kensington, Pa., assignor to PPG Industries, Inc., Pittsburgh, Pa.
Division of application Ser. No. 111,907, Feb. 2, 1971, now U.S. Pat. No. 3,761,236, Sept. 25, 1973, and which is a continuation-in-part of application Ser. No. 826,860, May 22, 1969, now abandoned. Divided and this application May 16, 1973, Ser. No. 360,886
Int. Cl. C03b 5/22, 15/02
U.S. Cl. 65—193          1 Claim

ABSTRACT OF THE DISCLOSURE

Sheet glass of commercial quality is made by a Pittsburgh Process without using a shutoff. Instead, means are used to seal the kiln from the tank, and a water-cooled pipe is submerged in the glass and lowers suitably the flow:throughout ratio. The submerged pipe has a diameter of 1.2 to 5 inches and it is located so that it obstructs the return flow, being positioned so that its top is not above the midpoint of the depth of the glass, and so that its bottom is at least one-fifth of the depth of the glass above the bottom. In this way the benefits of having no shutoff are obtained; lower costs, and an avoidance of defects in the products caused by shutoff.

CROSS-REFERENCE TO RELATED APPLICATION

This application is a division of application Ser. No. 111,907, filed Feb. 2, 1971, which issued as U.S. Pat. No. 3,761,236, on Sept. 25, 1973, which latter application was a continuation-in-part of application Ser. No. 826,860, filed May 22, 1969, now abandoned.

BACKGROUND OF THE INVENTION

1. Field of the Invention

This invention relates to a method of making sheet glass by a Pittsburgh Process, and in particular, to a method whereby the cost of producing sheet glass is notably lessened without any corresponding decrease in the quality of the product.

2. Description of the Prior Art.

Since about the 1920's there has been practiced the Pittsburgh Process, wherein sheet glass is made by drawing vertically from a kiln about 30 inches deep or more and containing a totally submerged drawbar of refractory material a sheet glass of about 80 to 110 inches wide. In the Pittsburgh Process as it has been practiced hitherto, there has been customarily used, upstream of the location of the drawbar and of the meniscus, a particularly submerged shutoff of refractory material. In use, such shutoff members exhibit wear and must be replaced from time to time. The shutoff tends to affect the flow pattern of the glass, disrupting it from strictly laminar flow and having as a consequence a deleterious effect upon the quality of the sheet-glass product. As happen with any refractory member submerged in the flow path of the glass, some of the member erodes and breaks off during use and thus contaminates the product. In the Pittsburgh Process, the shutoff serves several useful purposes, including diminishing the flow:throughput ratio and preventing sulphate-bearing gases from the melting tank from reaching the drawing kiln and the vicinity of the meniscus. It is considered likely that if such sulphate-bearing gases enter the drawing kiln, they will have an adverse effect upon the service life of the coolers therein.

It nearly invariably happens, moreover, that the above-mentioned movement of gases from the tank into the kiln take place, in the Pittsburgh Process, unless of shutoff is used. The tank has a headspace that is, in effect, substantially closed, and gaseous fuels are being fed into such headspace to burn and heat the batch, so that the tank headspace upstream of the shutoff is at an absolute pressure a little above the atmospheric. On the other hand, the kiln is located directly below the drawing machine, which extends vertically for about two or three building-stories and thus operates as a chimney or smoke-stack—as the less dense, hot gases in the headspace of the kiln rise, the ycreate a kinetic effect that causes even more of them to be withdrawn from the kiln than would occur merely from consideration of the tendency of hot gases to rise because of differences in density. This means that the headspace of the kiln in the Pittsburgh Process operates at a slight partial vacuum, say, on the order of one or two inches of water. In order to practice the Pittsburgh Process and obtain its advantages, the state of affairs indicated above is necessary.

It is true that the Colburn Process for making sheet glass has been operated for many years, and it does not use a shutoff. On the other hand, it does not use a vertical drawing machine that creates the chimney or smokestack effect; instead, the glass is drawn upward only a short distance and is then bent over a bending roll to a substantially horizontal plane. The bending operation must take place while the glass is relatively plastic or deformable, and we consider that this necessarily places a limitation on the quality of the glass that can be produced with such a process, because the bending roll, coming into contact with the glass while it is so deformable, necessarily introduces some distortions. The measures that need to be taken so that contact between glass and the bending roll in the Colburn Process is avoided (e.g., creating a gas film about the bending roll) are disadvantageously costly and are possibly of dubious effectiveness. All things considered, previous no-shutoff Colburn operations are not believed to suggest to a person of ordinary skill in the art the feasibility of operating a Pittsburgh Process without a shutoff.

To the extent that a Pittsburgh Process is operated with a high flow:throughput ratio, the process is relatively inefficient. In other words, it is generally undesirable to be consuming fuel in the melting tank at such a rate as to generate a substantial forward flow and a substantial return flow, with the throughput (amount of glass removed via the meniscus) being relatively small in comparison with the volumes of the above-mentioned forward and return flows. As indicated above, one of the purposes of a shutoff is to reduce the flow:throughput ratio to a manageable and desirable level, such as about 2:1. If no shutoff is used, and on other measures are taken, this ratio is likely to be 3:1 or higher.

SUMMARY OF THE INVENTION

In accordance with the invention, a Pittsburgh Process is practiced in which air-curtain means or similar non-contacting means are provided to seal the melting tank away from the drawing kiln, and at the same time, there is also provided, submerged within the molten glass and in such a position as to act to impede substantially and in an appropriate manner the forward flow and/or the return flow. When the instant invention is practiced, continual replacement of the refractory shutoff member hitherto customarily used is avoided, and at the same time, laminar flows of glass are more surely obtained, so that as a result, and the quality of the product is improved.

DESCRIPTION OF THE DRAWING

A complete understanding of the invention may be obtained from the foregoing and following description thereof, taken together with the appended drawing, in which:

The sole Figure is a schematic representation, in sectional elevation view, of one embodiment of equipment according to, and used in the practice of, the instant invention.

DESCRIPTION OF THE PREFERRED EMBODIMENTS

Referring to the Figure, there is shown a drawing kiln at 2 and a region 4 through which molten glass 6 passes to the kiln 2. Schematically indicated at 8 are air-curtain means that serve to prevent gases from the headspace region 10 from passing into the drawing kiln, as at 12, and thereby causing premature failure of the main coolers 14. The means 8 may take any suitable form, such as the air-curtain seal of Belgian Pat. No. 721,743, it being important for the purposes of the invention that the gas-seal means used be such that all of its solid elements are spaced from the surface of the molten glass, i.e., not in contact therewith or partly submerged therein. The gases supplied through the means 8 are preferably of such temperature as not to cool the glass 6 unduly. Moreover, the kinetic energy with which the gases from the means 8 impinge upon the glass 6 is preferably such that no substantial disruption of the laminar flow of the glass 6 occurs.

In the inlet end 9 of the tank 11, there are provided batch-feed means, indicated schematically at 13, and gaseous-fuel feed means, indicated at 15.

In accordance with the invention, there is provided, in addition to the gas-seal means 8, a pipe 16 that extends transversely of the main path of flow of glass 6 and is water-cooled. The pipe 16 may be made of AISI Type 446 stainless steel, and it is preferably supplied by suitable means (not shown) with cooling water, so as to effect the extraction of suitable amount of heat. The pipe 16 may have a diameter of about 2 inches, and be capable of extracting about 225,000 British thermal units per hour. In the embodiment of the invention shown in the Figure, the pipe 16 is located so that it impedes the forward flow of the glass 6. It is, for example, totally submerged in the molten glass, with its center lying about 9 inches below the surface of the glass if the glass is about 30 inches deep. As indicated by the arrow 20, and as is usual in the Pittsburgh Process, the glass 6 has an upper region characterized by forward flow; the arrow 22 indicates the rearward or return flow of the glass 6. For such a process wherein there is drawn from the kiln of about 50 tons per day of glass, it is usual for the forward flow to be on the order of 116 tons per day, assuming that a shutoff is used. If the shutoff is removed, the forward flow and the return flow are on the order of 140 tons per day. Although the removal of the shutoff has certain advantages as respects permitting glass to reach the meniscus while it is hotter and while its flow is more direct and more nearly laminar, omitting a shutoff is not ordinarily practiced because of consequent inefficiency in the melting operation, and because of danger of premature failure of the main coolers 14 or the contamination of the glass because of the buildup on the main coolers 14 of products of reaction with sulphates contained in the melting-tank gases, possibly followed by the contamination of the surface of the sheet-glass product with such reaction product.

As indicated at 24, the submerged pipe 18 has thereon a buildup of hardened glass about 1 to 2 inches thick; this, taken together with the diameter of the pipe, serves as a substantial barrier to the forward flow indicated by the arrow 22, and it brings the flow:throughput ratio accordingly into the desired range generally on the order of about 2:1 or a little bit more. At the same time, the gas-curtain means 8 serves to prevent sulphate-laden gases from the melting tank from causing trouble with the main coolers 14. Taken together, and, the features depicted in the Figure indicate a method of making vertically drawn sheet glass, in accordance with which there are obtained benefits of operating without a shutoff (a more nearly laminar flow of glass, hotter glass reaching meniscus so as to minimize variations from one side to the other in thickness of the sheet-glass product, avoidance of labor and material costs in connection with replacing or renewing of the shutoff, etc.) and at the same time the flow:throughput ratio is desirably reduced.

It will be apparent that the pipe 16 may, in another embodiment of the invention, be so located as to impede the return flow, rather than the forward flow. It is apparent that if this is done, care must be taken not to permit the buildup of glass 24 on the pipe to come into contact with the bottom 26. If that happens the bottom 26 begins to be cooled by conduction and a freeze-up condition may result. Fluid-mechanics considerations also indicate that the submerged pipe 16 should be located somewhat above or somewhat below the middle of the depth of the glass in the tank and kiln, since there is near the middle a surface or region of little or no flow and to the extent that the pipe 16 and its glass buildup 24 impinge upon such surface or region, they are relatively ineffective for the purpose of diminishing the flow:throughput ratio and may in some instances tend to generate undesirable flow disruptions that adversely affect the quality of the sheet-glass product.

With the invention, the costs connected with fabricating, installing and replacing the shutoff members hitherto used are avoided. There is no continual erosion of shutoff-refractory material that tends to contaminate the product. The upsets of the drawing process that occur when the shutoff requires replacement are also avoided.

I claim:

1. In apparatus for converting glass-batch materials to sheet glass that comprises
   a melting tank for containing a mass of molten glass and a drawing kiln communicating therewith,
   said tank and said kiln each having therein, between a roof and a bottom portion for containing molten glass, a headspace, said headspaces being in communication,
   said kiln having in its bottom molten glass containing portion a drawbar for total submergence in molten glass and said kiln having a vertical drawing machine extending upwardly from said molten glass containing bottom portion above said drawbar.
   means for feeding onto the surface of molten glass in said tank glass-batch material,
   means for feeding to said headspace of said tank gaseous fuel for the melting and heating of said glass-batch materials,
the combination therewith of
   means for directing a sufficient stream of gas downward in said headspace of said tank in the vicinity of said drawing kiln headspace to substantially seal one of said headspaces from the other, said gas directing means being spaced sufficiently from said bottom portion of said tank to be above the intended surface of molten glass therein, and
   an elongated cooling means positioned in said bottom portion of said tank for being totally submerged in molten glass therein, and extending transversely across said bottom portion of said tank substantially beneath said gas directing means.

References Cited

UNITED STATES PATENTS

| | | | |
|---|---|---|---|
| 2,140,281 | 12/1938 | Drake | 65—204 |
| 1,667,145 | 4/1928 | Diedericas | 65—204 X |
| 3,285,726 | 11/1966 | Ward | 65—204 X |

FRANK W. MIGA, Primary Examiner

U.S. Cl. X.R.

65—203, 204, 337, 346